United States Patent
Ito

(10) Patent No.: US 9,007,658 B2
(45) Date of Patent: Apr. 14, 2015

(54) INSPECTION APPARATUS, INSPECTION METHOD, AND PROGRAM

(71) Applicant: Canon Kabushiki Kaisha, Tokyo (JP)

(72) Inventor: Hiroki Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/927,317

(22) Filed: Jun. 26, 2013

(65) Prior Publication Data

US 2014/0002842 A1    Jan. 2, 2014

(30) Foreign Application Priority Data

Jun. 27, 2012    (JP) ................................ 2012-144450

(51) Int. Cl.
```
G06K 15/00    (2006.01)
G06K 9/00     (2006.01)
B41F 33/00    (2006.01)
G06T 7/00     (2006.01)
H04N 1/40     (2006.01)
```

(52) U.S. Cl.
CPC ........ *G06K 9/00442* (2013.01); *B41F 33/0036* (2013.01); *G06T 7/001* (2013.01); *G06T 2207/30144* (2013.01)

(58) Field of Classification Search
CPC . H04N 1/6036; H04N 1/6041; H04N 1/6044; H04N 1/6047; H04N 1/6055; H04N 1/00883; H04N 1/00045; H04N 1/6033; H04N 1/00031; G06K 15/027; G06K 9/68; G06K 9/3275; G06K 15/5041; G06K 15/50; G06K 15/5058; G03G 15/5041; G03G 15/50; G03G 15/5058; G06T 7/001; G06T 7/0002

USPC ............... 358/1.11–1.18, 1.9, 2.1, 3.06, 3.22, 358/3.26, 3.28, 518–527, 530–539, 504, 358/406; 399/15, 49; 382/165, 181, 194, 382/204, 218, 112, 216–22

See application file for complete search history.

(56) References Cited

U.S. PATENT DOCUMENTS

| | | | |
|---|---|---|---|
| 5,712,921 A * | 1/1998 | Zabele | 382/112 |
| 2008/0292335 A1* | 11/2008 | Kubota et al. | 399/39 |
| 2009/0034836 A1* | 2/2009 | Shinchi | 382/167 |
| 2009/0059266 A1* | 3/2009 | Jackson et al. | 358/1.14 |
| 2011/0019244 A1* | 1/2011 | Uwatoko | 358/448 |
| 2012/0070040 A1* | 3/2012 | Vans et al. | 382/112 |

FOREIGN PATENT DOCUMENTS

JP    2003094627 A  *  4/2003

\* cited by examiner

*Primary Examiner* — Chad Dickerson

(74) *Attorney, Agent, or Firm* — Carter, DeLuca, Farrell & Schmidt, LLP

(57) ABSTRACT

Color shift detection requires additional processing as compared to detection of other items, and thus increases the load on the inspection processing. Conventional inspection apparatuses have a problem that the processing speed associated with inspection is affected and the costs of the inspection processing apparatus are raised. In a case where an inspection setting specified by a user includes color shift detection (YES in S406), scan image data of a printed material for a test print is determined to be a reference (S407). Then, comparison is made between scan image data obtained by scanning the printed material associated with a print job and the scan image data of the printed material for the test print.

5 Claims, 12 Drawing Sheets

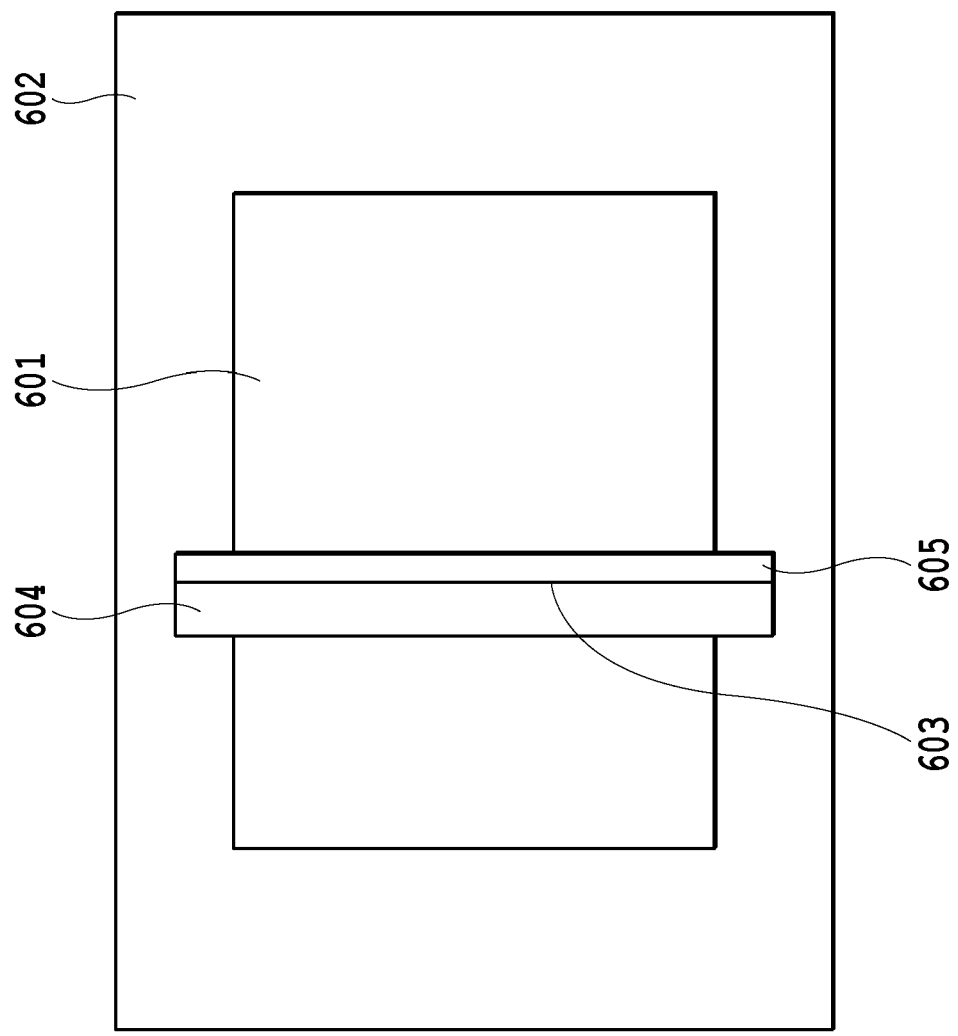

701
REFERENCE IMAGE DATA

702
SCAN IMAGE DATA

INSPECTION APPARATUS, INSPECTION METHOD, AND PROGRAM

BACKGROUND OF THE INVENTION

1. Field of the Invention

The present invention relates to an inspection apparatus, inspection method, and program for determining whether or not a quality of a printed material is good.

2. Description of the Related Art

In many industries, particularly in the conventional printing industry, digital printing technology based on electrophotography or the like, which is called print on demand (POD), has been commonly used, and there is a need for efficiently producing a required amount of printed materials while maintaining their print qualities. Further, recently in most offices, there is a need for efficiently producing printed materials with a particular print quality.

In conventional image quality inspection of printed materials, however, operators generally inspect the printed materials by a visual check. Since the image quality inspection depends on sensor evaluation by operators, variations may be caused in inspection levels. Further, an inspection time depends on operator's experience, and due to dependence on manpower, there is a limit to the reduction of the inspection time.

Accordingly, apparatuses for inspecting a quality of a printed material have been invented which can maintain a particular inspection quality while reducing an inspection time.

For example, there is an apparatus for inspecting a quality of a printed material by scanning a printed material after completing the printing and comparing a print image on the printed material with a scan image obtained by scanning the printed material having the image printed thereon (see, for example, Japanese Patent Laid-Open No. 2003-94627). Japanese Patent Laid-Open No. 2003-94627 also discloses that detection of printing errors cancels printing. As the content of inspection, Japanese Patent Laid-Open No. 2003-94627 discloses detecting blots, faintly printing, image void, density unevenness, color shift or the like on the printed image and determining whether there is any print error or input error associated with printed variable data.

In detecting color impression shift among inspection items, it is necessary to consider differences in color space characteristics between a print image and a scan image as well as scanning characteristics of a scanner used for scanning printed materials. Therefore, in the technique disclosed in Japanese Patent Laid-Open No. 2003-94627, it is necessary to further perform color space conversion or color correction on the print image associated with printing.

Since detection of color shift requires additional processing as compared to detection of other items, the load on the inspection processing is increased. Therefore, one problem is that the processing speed associated with inspection by the inspection apparatus is affected and the costs of the inspection processing apparatus are raised.

In view of the above-described problem of the present invention, it is an object of the present invention to provide an image forming apparatus with image inspection functions which do not affect inspection processing speed and can achieve low costs by reducing the load on the inspection processing performed on the inspection items.

SUMMARY OF THE INVENTION

To solve the above-described problem, an inspection apparatus according to the present invention comprises: a scanning unit configured to generate scan image data by scanning a printed material to be inspected on which print image data associated with a print job is printed; an accepting unit configured to accept an inspection setting indicating an inspection content for the printed material to be inspected; a determination unit configured to determine the print image data or scan image data generated by scanning a prepared printed material on which the print image data is printed as a test print to be a reference, according to the accepted inspection setting; and a determination unit configured to determine whether or not a quality of the printed material to be inspected is good by comparing the scan image data generated by the scanning unit with the image data determined as the reference by the determination unit.

Provided is an inspection apparatus with image inspection functions which do not affect inspection processing speed and can achieve low costs.

Further features of the present invention will become apparent from the following description of exemplary embodiments with reference to the attached drawings.

BRIEF DESCRIPTION OF THE DRAWINGS

FIG. 6 illustrates an operation to scan a printed material in one embodiment of the present invention;

DESCRIPTION OF THE EMBODIMENTS

Exemplary embodiments of the present invention will be described with reference to the drawings.

First Embodiment

Figure 1:
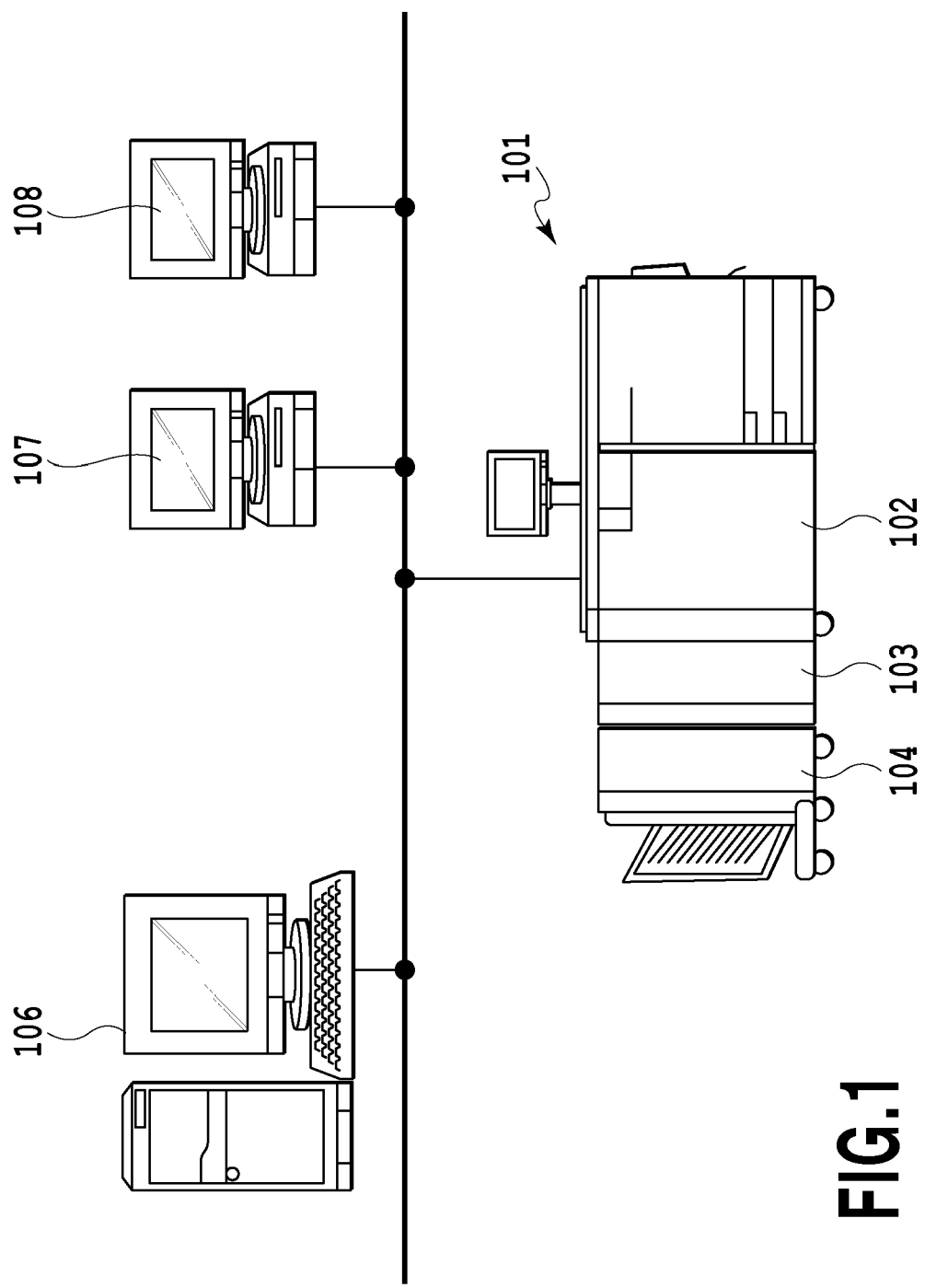
FIG. 1 shows an exemplary configuration of an image processing system in accordance with one embodiment of the present invention.

FIG. 1 shows an exemplary configuration of an image processing system including an image forming apparatus in accordance with one embodiment of the present invention.

An image forming apparatus 101 performs an inline image inspection, which includes a series of steps from printing a print image to acquire a printed material, scanning the printed material to be inspected, to finishing.

In particular, the image forming apparatus 101 includes an image forming unit 102, an image inspection unit 103, and a finishing unit 104. The image forming unit 102 performs print processing for printing an image on a recording medium, such as a sheet of paper. The printed recording medium or printed material is conveyed to the image inspection unit 103 so that image inspection is performed on the printed material. Then, the finishing unit 104 discharges the printed material (i.e., paper ejection) received from the image inspection unit 103.

A LAN 105 is a network for connecting the image forming apparatus 101, a print server 106, and client personal computers (PCs) 107 and 108. The LAN 105 may be any form as long as they can communicate with each other.

Once a user operates the client PC 107 or 108 to generate PDL data associated with a print job indicating a print instruction, the PDL data is transmitted to the print server 106 via the LAN 105. The print server 106 then transmits the PDL data to the image forming apparatus 101 via the LAN 105.

The image forming apparatus 101 which received the PDL data performs an inline image inspection including image printing, image inspection, and finishing.

Figure 2:
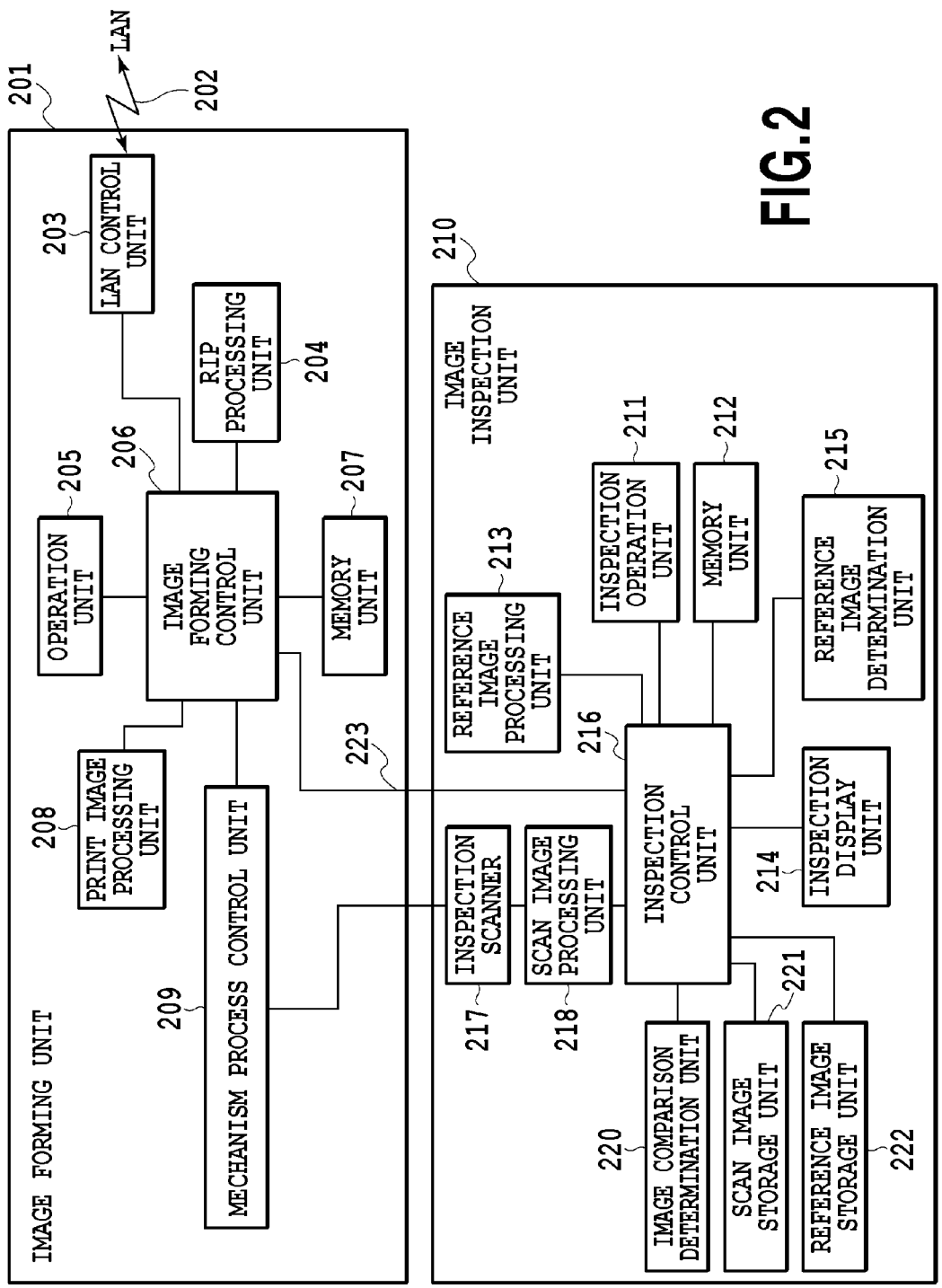
FIG. 2 is a block diagram of hardware configurations of an image forming unit and an image inspection unit in accordance with one embodiment of the present invention.

FIG. 2 is a block diagram showing hardware configurations of the image forming unit 102 and the image inspection unit 103 in accordance with one embodiment of the present invention.

Here, an image forming unit 201 corresponds to the image forming unit 102 of FIG. 1, and an image inspection unit 210 corresponds to the image inspection unit 103. A LAN 202 corresponds to the LAN 105 of FIG. 1.

The image inspection unit 201 includes an image forming control unit 206, a LAN control unit 203, a RIP processing unit 204, an operation unit 205, a memory unit 207, a print image processing unit 208, a mechanism process control unit 209, and an image forming unit (not shown).

The image forming control unit 206 has control over the above-mentioned units.

The LAN control unit 203 performs control to receive input image data, such as PDL data, from the LAN 202. The LAN control unit 203 also performs control to transmit various image data or apparatus information via the LAN 202.

The RIP processing unit 204 interprets the PDL data received by the LAN control unit 203 and expands it to RIP data.

The operation unit 205 includes an operation panel unit used by a user for various operations and a display unit for displaying images.

The print image processing unit 208 generates print image data which is printed on a recording medium by the image forming unit (not shown) of the image forming unit 201.

On the basis of the print image data generated by the print image processing unit 208, the image forming unit (not shown) prints an image on the recording medium through, for example, an electrophotographic process, and conveys the recording medium (printed material) having the image printed thereon to the image inspection unit 103.

The memory unit 207 has a function as data memory which stores PDL data received by the LAN control unit 203, print image data or the like and also a function as program memory which stores control programs.

In printing an image on a recording medium, the mechanism process control unit 209 controls the entire operations of the image forming apparatus 101 of FIG. 1. That is, the mechanism process control unit 209 is associated with print processing by the image forming unit 102, image inspection processing by the image inspection unit 103, and paper discharge processing by the finishing unit 104, and performs printing control on the recording medium and conveyance mechanism control on the recording medium.

The image inspection unit 210 includes an inspection control unit 216 which is connected to each of the units in the image inspection unit 210. Incidentally, an inspection scanner 217 is controlled by the mechanism process control unit 209 of the image forming unit 201.

An inspection operation unit 211 is an operation panel which accepts various operations by a user for image inspection. For example, the inspection operation unit 211 accepts an inspection setting from a user as information. The inspection setting is setting information on the image inspection content. In the present embodiment, it includes setting information indicating detection of color shift in a printed material or setting information indicating detection of whether or not the printed material based on variable data includes print defects.

Memory unit 212 stores various processing programs executed by the image inspection unit 210.

A reference image processing unit 213 performs predetermined image processing on reference image data. In particular, the reference image processing unit 213 performs de-screening which converts image data from binary image data to multivalued image data, tone correction, resolution conversion or the like.

An inspection display unit 214 displays inspection results of image inspection. Exemplary displays of the inspection results of image inspection will be described later with reference to FIGS. 8 and 9.

A reference image determination unit 215 determines whether to generate a reference on the basis of print image data or from a scan image obtained by scanning a test printed material. This processing will be described later with reference to FIG. 4.

The inspection scanner 217 includes a light source for reading and a line sensor, scans and reads a surface of the printed material. For example, a reading resolution of the line sensor in the inspection scanner 217 can be set to 600 dpi. The details of the reading of printed materials will be described later with reference to FIG. 6.

A scan image processing unit 218 performs image processing on scan image data obtained by the inspection scanner 217 for inspection in an image comparison determination unit 220. In particular, the scan image processing unit 218 performs resolution conversion processing, correction processing of scanner properties, or the like.

The image comparison determination unit 220 compares a print image with a scan image of the printed material and determines whether a printed result is non-defective or defective. The comparison processing of images will be described later with reference to FIG. 5.

A scan image storage unit 221 stores the scan image data which is processed by the scan image processing unit 218 in determination by the image comparison determination unit 220.

A reference image storage unit 222 stores reference image data which is sent from the image forming unit 201 and image processed by the reference image processing unit 213.

The image forming control unit 206 and the inspection control unit 216 are connected via a communication channel 223. The connection via the communication channel 223 allows communication of reference image data, print setting information as set by the image forming control unit 206, inspection setting information as set by the inspection control unit 216 or the like between the image forming control unit 206 and the inspection control unit 216.

It should be noted that the present embodiment has shown the aspect of connection between the image forming control unit 206 and the inspection control unit 216 by use of a dedicated line. However, the way of connection is not limited thereto. For instance, a LAN control unit (not shown) may be provided for the image inspection unit 210 for connection with the inspection control unit 216, and the image forming control unit 206 may be connected with the inspection control unit 216 via a LAN control unit 203 in the image forming unit 201 by using a general LAN connection.

Further, although the present embodiment has shown the aspect of one-to-one connection between the image forming control unit 206 and the inspection control unit 216, one or more inspection control units 216 may be connected with one or more image forming control units 206.

Next, image inspection processing of the present embodiment will be described in detail.

First, a process for determination of a reference, which is a preceding stage of image inspection, will be described with reference to the flow chart of FIG. 4.

First, the inspection control unit 216 in the image inspection unit 210 determines whether a user has entered an inspection setting regarding inspection items, such as a precision level of image inspection, for the inspection operation unit 211 in the image forming unit (S401).

Here, a precision level of image inspection indicates to what extent of image defect is detected in image inspection.

For instance, detecting typographical errors and omissions and omissions of graphics and lines in relatively large portions which are caused during printing, or detecting relatively large blots or the like on printed materials does not require high-precision inspection which places a heavy load on the processing. On the other hand, detecting small spots on printed materials or faintly printing in small areas of text, graphics, and lines requires high-precision inspection.

In particular, a precision level in image inspection depends on inspection resolutions of a reference image and a scan image in comparing the images by the image inspection unit 210. In the present embodiment, a user can select a precision level in image inspection from "standard" for inspection at a standard level and "high resolution" for inspection with higher precision.

Incidentally, inspection items indicate the content of inspection in image inspection. Inspection items include the detection of print defects such as blots, faintly printing, image void, gradational density unevenness on a recording medium, and color shift in color printing. These print defects are caused by failures in an engine process system.

Inspection items also include the detection of print errors or input errors of variable data. It is determined whether the variable data is printed in a readable manner in variable data printing to detect print defects caused by failures in an engine process system or print setting errors by a user.

Incidentally, in variable data printing, in the case of printing multiple pages in a single job, a user specifies portions on which variable data is printed. Variable data can be optionally set by a user. For instance, in the case of printing variable data for each of three pages, it is possible to print an image A, an image B, and an image C on a first page, a second page, and a third page, respectively, as set by the user for respective areas on which the variable data is printed. It is also possible to optionally combine images associated with the variable data as specified by the user.

In the case of having an inspection setting entered in S401, the inspection control unit 216 determines whether the inspection setting in S401 includes image inspection (S402).

In a case where the image inspection is not set (NO in S402), the inspection control unit 216 sends the setting to the image forming control unit 206 and completes the process (S403).

On the other hand, in a case where the image inspection is set (YES in S402), the inspection control unit 216 sends the content of the inspection setting to the image forming control unit 206 (S404).

Then, the inspection control unit 216 receives from the image forming control unit 206 a print setting indicating the content of the setting used in processing print image data by the print image processing unit 208 (S405). The print setting is information indicating whether the print image data is a color image or a black and white image and whether the print image data is variable data.

Then, the reference image determination unit 215 determines whether the instructed image inspection includes color shift detection on the basis of the print setting received in S405 and the inspection setting entered in S401 (S406).

In a case where it is determined that the image inspection includes color shift detection in S406, the reference image determination unit 215 determines the scan image data obtained by scanning the printed material to be a reference (S407).

On the other hand, in a case where it is determined that the image inspection does not include color shift detection in S406, the reference image determination unit 215 determines the print image data to be a reference (S408).

Finally, the inspection control unit 216 sends reference setting information indicating a reference determined in S407 or S408 to the image forming control unit 206 and completes the process (S409).

Figure 4:
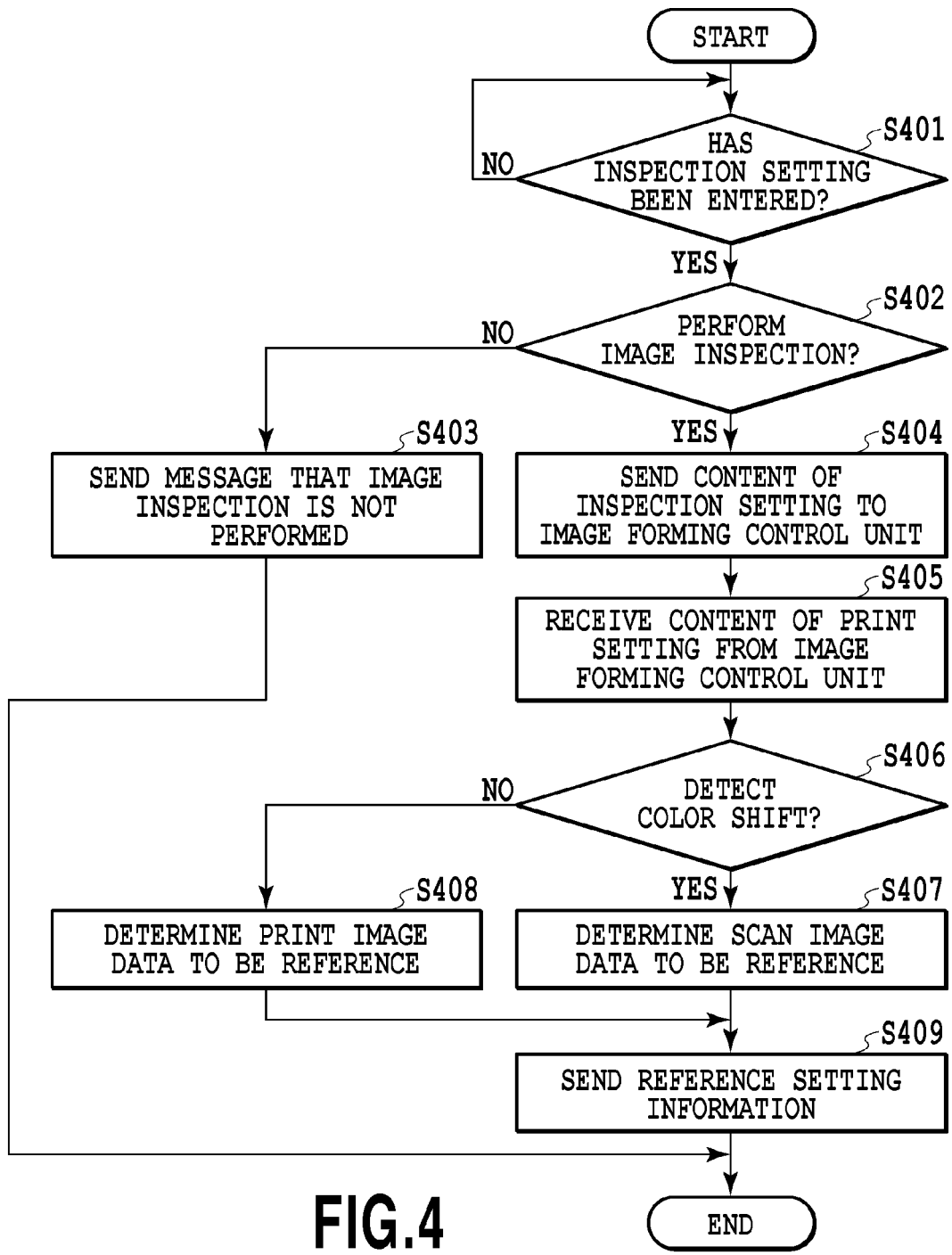
FIG. 4 is a flow chart of a reference determination process in the first embodiment.

In this manner, a reference is determined in accordance with the process shown in FIG. 4.

Next, an image inspection process in the image inspection unit 210 is described with reference to the flow chart of FIG. 5.

First, the inspection control unit 216 determines whether a reference determined by the reference image determination unit 215 is scan image data or print image data (S501).

In a case where a reference is print image data (NO in S501), the inspection control unit 216 receives the print image data generated by the print image processing unit 208 to the image forming control unit 206 (S502).

Then, the inspection control unit 216 transfers the print image data to the reference image processing unit 213. The reference image processing unit 213 performs reference image processing which generates reference image data obtained by performing resolution conversion on the print image data in accordance with the inspection setting entered in S401 (S503).

Then, the inspection control unit 216 stores the reference image data in the reference image storage unit 222 (S504).

On the other hand, in a case where a reference is scan image data (YES in S501), the inspection control unit 216 instructs the image forming control unit 206 to control the mechanism process control unit 209 to test print the data on a recording medium. In this test print, only one copy of a test image generated in S304, which will be described later, is printed in S308. A printed material having the test image printed on the recording medium by the test print is conveyed on a conveying belt to the image inspection unit 210. The inspection scanner 217 then scans the printed recording medium to obtain scan image data of the printed material for which the test print was done.

Referring to FIG. 6, it will be described in detail how to obtain scan image data by scanning a printed material for which a test print is done.

In FIG. 6, a recording medium 601 has a print image printed thereon. An inspection scanner 604 includes a scanning light source 603 and a scanning sensor 605.

The inspection scanner 604 corresponding to the inspection scanner 217 scans the recording medium 601 which is conveyed on a conveying belt 602. In particular, while the recording medium 601 having an image printed thereon is conveyed on the conveying belt 602, as approaching the inspection scanner 604, the recording medium 601 moves so that the image is scanned and captured by the inspection scanner 604.

At the same time, the inspection control unit 216 controls the inspection scanner 217 through the scan image processing unit 218 to cause the scanning light source 603 to emit light, allowing the scanning sensor 605 to capture the image. The inspection control unit 216 then causes the scan image processing unit 218 to process the image captured by the scanning sensor 605 to obtain scan image data (S505).

It should be noted that in an apparatus in accordance with the present embodiment, a scanning resolution of the scanning sensor 605 of the inspection scanner 604 is 600 dpi. Accordingly, a resolution in a main scanning direction during image scanning is 600 dpi.

Incidentally, the scan image processing unit 218 processes the scan image data so that a resolution in a conveying direction of the recording medium 601 during scanning and reading, that is, a resolution in a sub-scanning direction, also becomes 600 dpi.

Incidentally, in an apparatus in accordance with the present embodiment, the scan image processing unit 218 corrects the position of scan image data to a reference position even in a case where an inclination or position displacement occurs in a scanned image due to an inclination or displacement of the recording medium 601 during conveyance.

Referring back to FIG. 5, the inspection control unit 216 controls the scan image processing unit 218 to perform scan image processing on the scan image data obtained in S505 (S506).

Then, the inspection control unit 216 prompts a user to enter "OK" or "NG" (no good) via the inspection operation unit 211 as to whether the test print has a desirable quality for the user, and obtains a user input (test result input) (S507). It should be noted that a user enters "OK" when the user determines the test print to have a sufficient quality, whereas the user enters "NG" when the user determines the test print to have an insufficient quality.

The inspection control unit 216 then determines whether the test result input obtained in S507 is "OK" or "NG" (S508).

In a case where the test result input is "NG" (NO in S508), the inspection control unit 216 instructs the image forming control unit 206 to change the print setting and reperform a test print (S509). In this case, the inspection control unit 216 functions as a print instruction unit configured to instruct the image forming unit 201 to do a test print.

On the other hand, in a case where the test result input is "OK" (YES in S508), the reference image storage unit 222 stores the scan image data associated with the test print as reference image data (S510).

Then, the inspection control unit 216 controls the inspection scanner 217 and the scan image processing unit 218 to cause the scanning sensor 605 to scan the printed material to be inspected which is associated with the print job printed based on the print instructions by the image forming control unit 206, and obtains scan image data (S511). Incidentally, scan image data obtaining processing performed in S511 is the same process as that performed in S505.

Then, the inspection control unit 216 causes the scan image processing unit 218 to perform scan image processing on the scan image data of the printed material obtained in S511 associated with the print job (S512).

The inspection control unit 216 then causes the scan image storage unit 221 to store the scan image data on which the scan image processing was performed (S513).

Then, the inspection control unit 216 compares the stored scan image data with the reference image data. This begins by transferring the reference image data in the reference image storage unit 222 and the scan image data in the scan image storage unit 221 to the image comparison determination unit 220 (S514).

In this manner, image inspection associated with the printed material starts once the image inspection unit 210 obtains both reference image data and scan image data.

The image comparison processing in S514 will be described in detail below.

In the present embodiment, as described above, the reference image processing unit 213 and the scan image processing unit 218 individually perform resolution conversion, and then the reference image data and scan image data having corresponding inspection resolutions are matched by using bitmaps. That is, the reference image data and the scan image data are individually divided into pixel blocks, each including 5×5 pixels, and the densities are compared based on RGB or CMYK for each pixel block.

Incidentally, it is possible to change color model settings to select from RGB and CMYK which is used for comparison. For example, comparison of color image data is performed on the basis of RGB and comparison of black and white image data is performed on the basis of CMYK (K only), according to the type of image.

Next, referring to FIGS. 7A and 7B, exemplary image processing on the basis of 5×5 pixel blocks will be described.

Figure 7A:
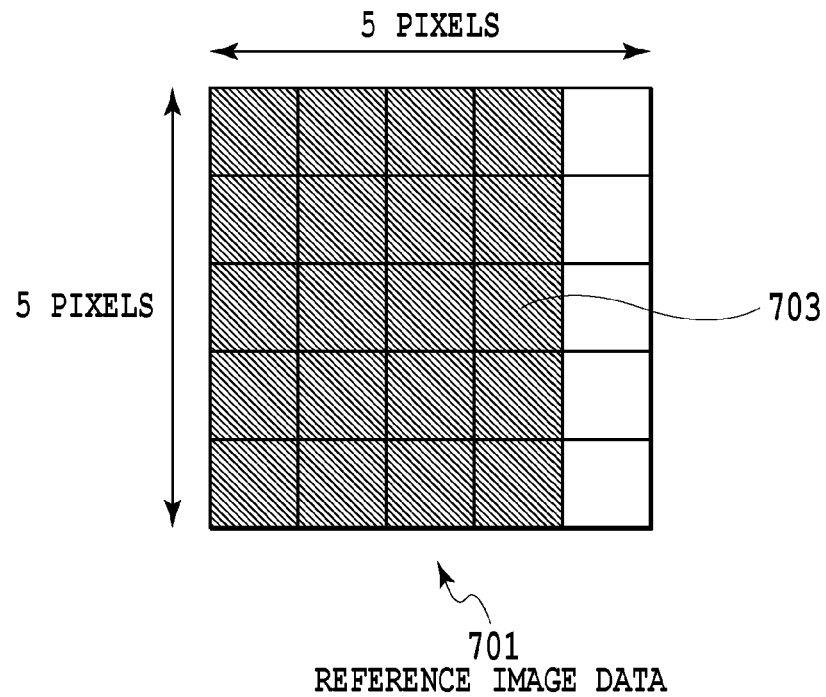
FIG. 7A shows reference image data used for image comparison in one embodiment of the present invention.
Figure 7B:
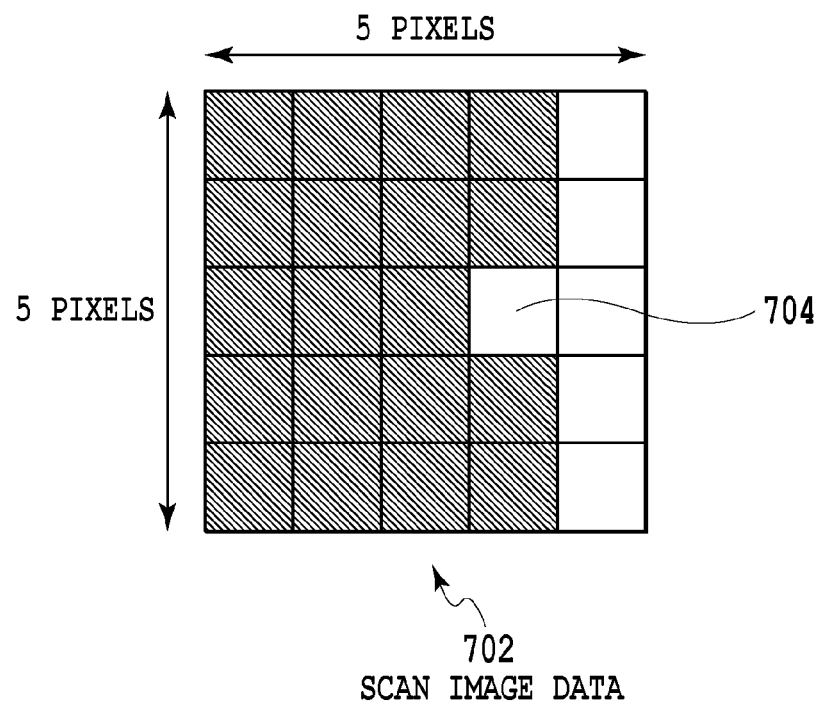
FIG. 7B shows scan image data used for image comparison in one embodiment of the present invention.

FIGS. 7A and 7B show reference image data 701 and scan image data 702, respectively, based on which image comparison is performed. Incidentally, each pixel is a black and white image represented with halftones by multivalued data having density data of 0 to 255.

In image determination, a comparison value is calculated based on the following equation:

Comparison value=[Scanned data image density data value]−[Reference image density data value].

Then, an absolute value of the calculated comparison value and a predetermined acceptable density are compared. In a case where an absolute value of the calculated comparison value is smaller than an acceptable density, the pixel is determined to be "good".

For instance, in a case where an acceptable density is set to 40 and given that an image density data value of an image 703 is 255 and an image density of an image 704 is 0. In this case, since an absolute value of the comparison value is 255, which is greater than the predetermined acceptable density value of 40, the image 703 and the image 704 are determined to be "bad".

In this manner, this determination processing is repeated for each pixel within the 5×5 pixel block to obtain the percentage of "good" determination (good determination rate) in the pixel block. Then, the percentage of "good" determination in the pixel block and a predetermined determination threshold are compared.

For example, the case of setting a determination threshold of 80% will be described. In a case where only one pixel is determined to be "bad" in the pixel block, a determination rate is 24/25 which is thus expressed as 96%. Since a determination rate of 96% exceeds the predetermined determination threshold of 80%, this pixel block is determined to be "good".

In this manner, every pixel block is determined to be either "good" or "bad". In a case where all of the pixel blocks are determined to be "good", the printed material is determined to be non-defective. On the other hand, in a case where one or more pixel blocks are determined to be "bad", the printed material is determined to be defective.

As is obvious from the above description, determination of "good" or "bad" is given to each of the pixels. Since image data with a higher resolution consists of more pixels than image data with a lower resolution, the number of comparison is greater as compared to an image with a lower resolution.

Next, referring back to FIG. 5, after the image comparison in S514, the inspection control unit 216 sends the determination result obtained by the image comparison determination unit 220 to the image forming control unit 206 (S515).

Then, the inspection control unit 216 determines the content of the determination result as sent to display the result on the inspection display unit 214 (S516). That is, in a case where the determination result is "non-defective", the inspection control unit 216 causes the inspection display unit 214 to display the message that the printed material is non-defective (S517).

Figure 8:
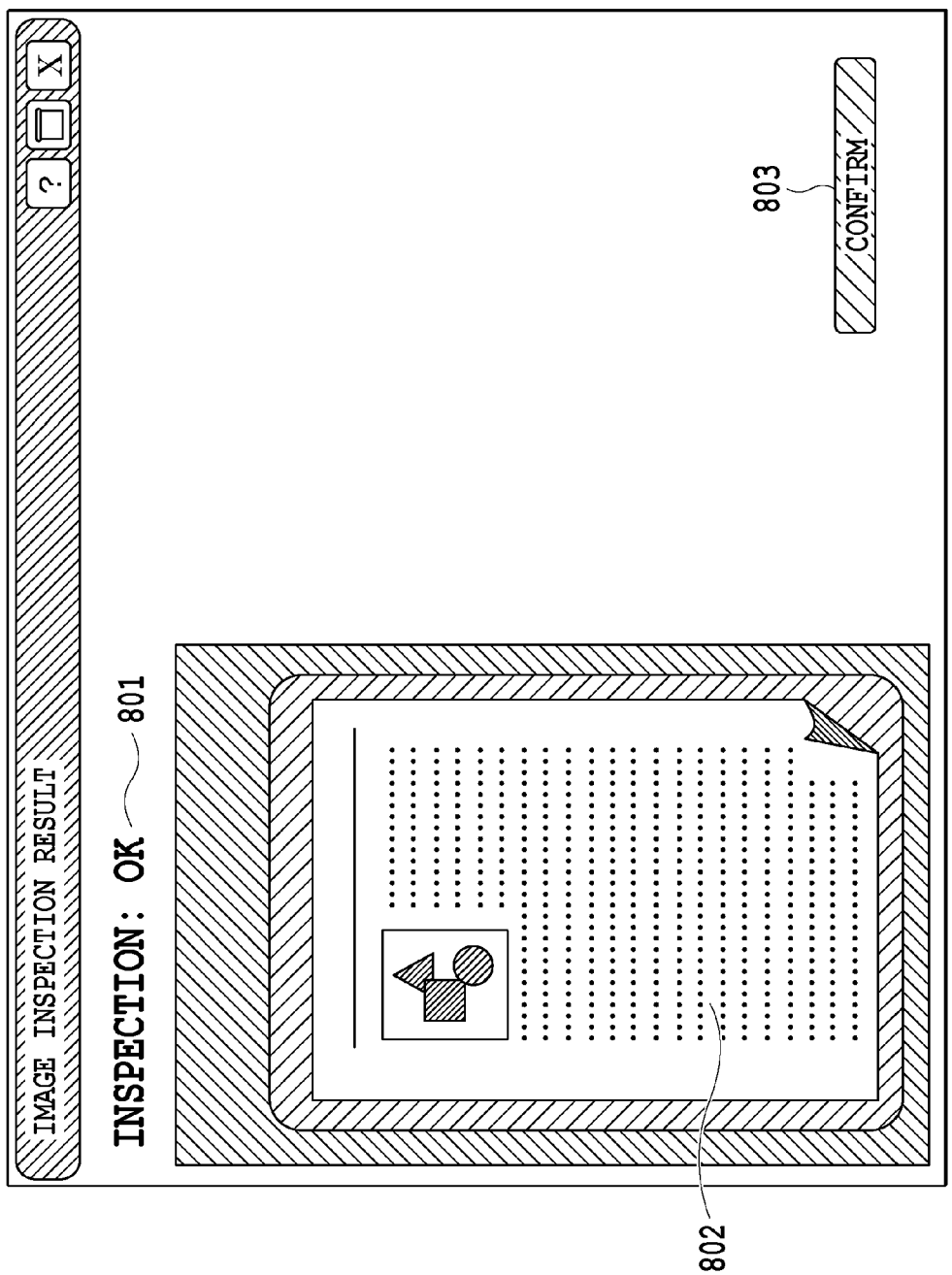
FIG. 8 shows an exemplary display of an inspection result in one embodiment of the present invention.

Referring to FIG. 8, an exemplary display in the inspection display unit 214 in a case where the printed material is non-defective will be described below.

An inspection result 801 is a display area indicating whether a printed material is non-defective or defective. FIG. 8 shows OK indicating that the printed material is non-defective. Further, an image 802 is a scan image based on the scan image data stored in the scan image storage unit 221 in S513. Further, a button 803 is used to ask a user for confirmation that the determination result of the printed material has been recognized. After being displayed, the button 803 is deleted once the user presses it, which means that the user has confirmed the result.

On the other hand, referring back to FIG. 5, in a case where the determination result of the printed material is "defective", the inspection control unit 216 causes the inspection display unit 214 to display the message that the printed material is defective (S518).

Figure 9:
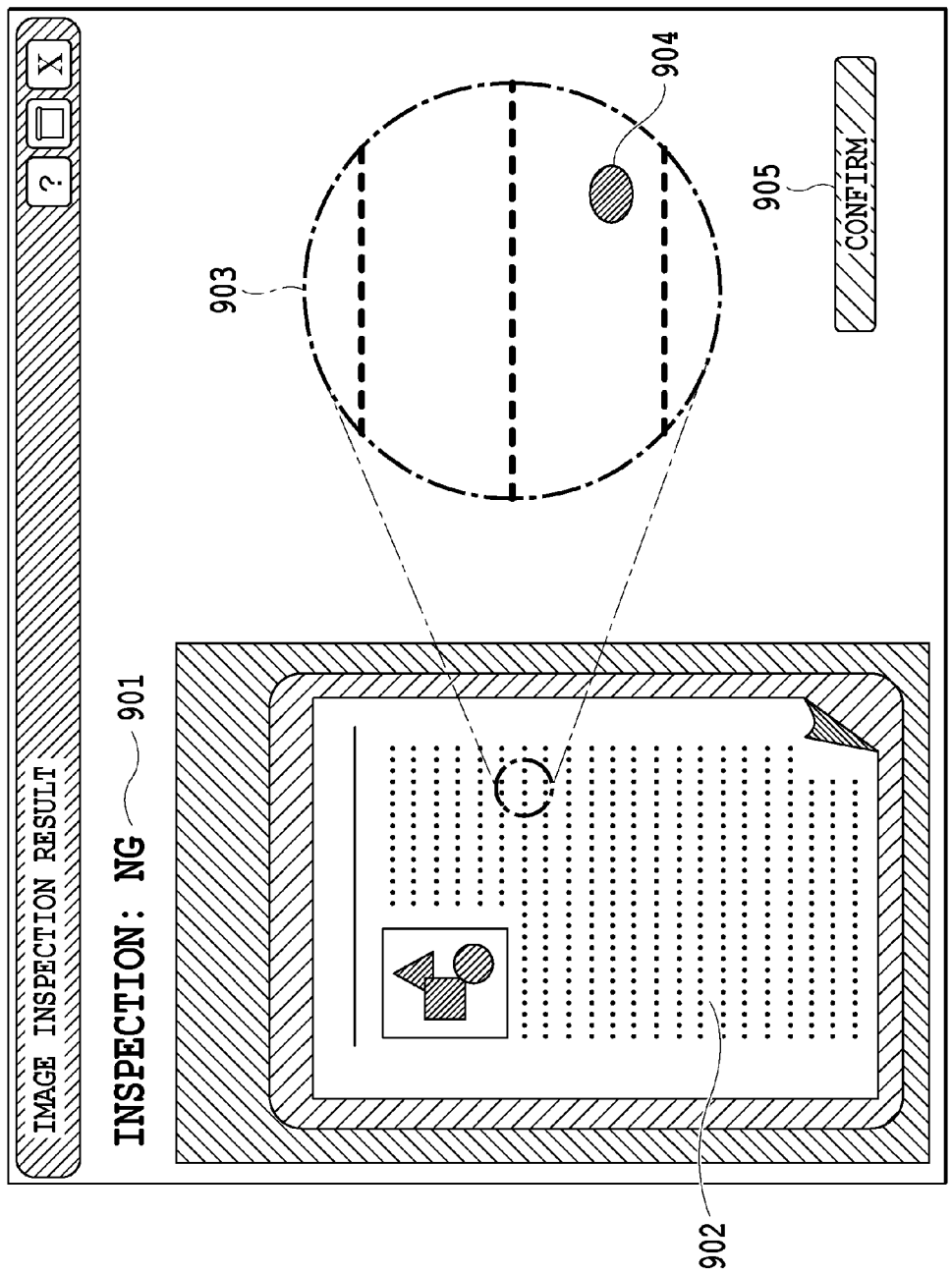
FIG. 9 shows an exemplary display of an inspection result in one embodiment of the present invention.

FIG. 9 shows an exemplary display on the inspection display unit 214 in a case where the printed material is defective.

An inspection result 901 shows NG indicating that the printed material is defective. An image 902 is a scan image based on the scan image data stored in the scan image storage unit 221 in S513.

A scan image which may cause a determination result of "defective" will be described. For example, as shown in an enlarged view 903 of FIG. 9, inclusion of a blot (black spot) 904 in a scan image gives a determination result that the printed material is defective.

A button 905 is used to ask a user for confirmation. The button 905 is deleted once the user presses it, which means that the user has confirmed the result.

Next, a printing process performed by the image forming unit 201 will be described with reference to the flow chart of FIG. 3.

First, the image forming control unit 206 determines whether the LAN control unit 203 and the operation unit 205 of FIG. 2 have sent a print instruction (S301).

The content of print instructions includes, for example, whether to print, and if yes, a print resolution, whether to print in color or black and white, or the like.

In a case where it is determined that there is a print instruction in S301, the image forming control unit 206 receives the inspection setting sent by the inspection control unit 216 in the above-described S404 (S302).

Then, the image forming control unit 206 sends the print setting entered by a user through a PC connected with the LAN 202 or the operation unit 205 to the inspection control unit 216 (S303).

Then, the image forming control unit 206 controls the RIP processing unit 204 and the print image processing unit 208 to generate print image data associated with a print job (S304).

Then, the image forming control unit 206 determines whether to perform image inspection on the basis of the inspection setting received in S302 (S305).

In a case where the image inspection is not performed (NO in S305), only the print processing is performed, and the process proceeds to S310.

On the other hand, in a case where the image inspection is performed (YES in S305), the image forming control unit 206 determines whether the reference setting information sent in S409 of FIG. 4 indicates "scan image data" or "print image data" (S306).

In a case where the reference setting information indicates "print image data" (NO in S306), the image forming control unit 206 sends the print image data generated in S304 to the inspection control unit 216, and the process proceeds to S310 (S307).

On the other hand, in a case where the reference setting information indicates "scan image data" (YES in S306), the image forming control unit 206 controls the mechanism process control unit to print one copy of the print image data generated in S304 for a test print (S308).

Then, the image forming control unit 206 determines whether a test print input obtained by quality determination by a user's visual check in the above-described S508 is "OK" or "NG" (S309).

In a case where the test print input is "OK" (YES in S309), the process proceeds to S310. On the other hand, in a case where the test print input is "NG" (NO in S309), the process proceeds to S308 to reperform a test print.

Finally, the image forming control unit 206 controls the mechanism process control unit in S310 to print the print image data generated in S304 according to the print setting as set in S401.

In accordance with the above-described process, the image forming unit 201 performs the print processing.

Advantages of color shift detection in the present embodiment will be described.

Obtaining scan image data of a test print (S505) and performing image processing thereon (S506) and obtaining scan image data of a printed material associated with a print job (S511) and performing image processing thereon (S512) are the processing performed by the inspection scanner 217 and the scan image processing unit 218.

Since scanning and image processing are performed on a test print and on a printed material associated with a print job in the same manner, no difference is caused in color space characteristics and scanning characteristics of a scanner. That is, in the color shift detection, it is not necessary to perform color space conversion or color correction on the print image data which serves as a reference. Accordingly, it is possible to reduce the load on the inspection processing.

As described above, using an appropriate reference according to the content of inspection processing can avoid affecting inspection processing speed. Further, it is possible to provide an image forming apparatus with image inspection functions which achieve low costs.

Second Embodiment

A second embodiment is an embodiment used in the case of performing variable data printing (VDP).

Figure 3:
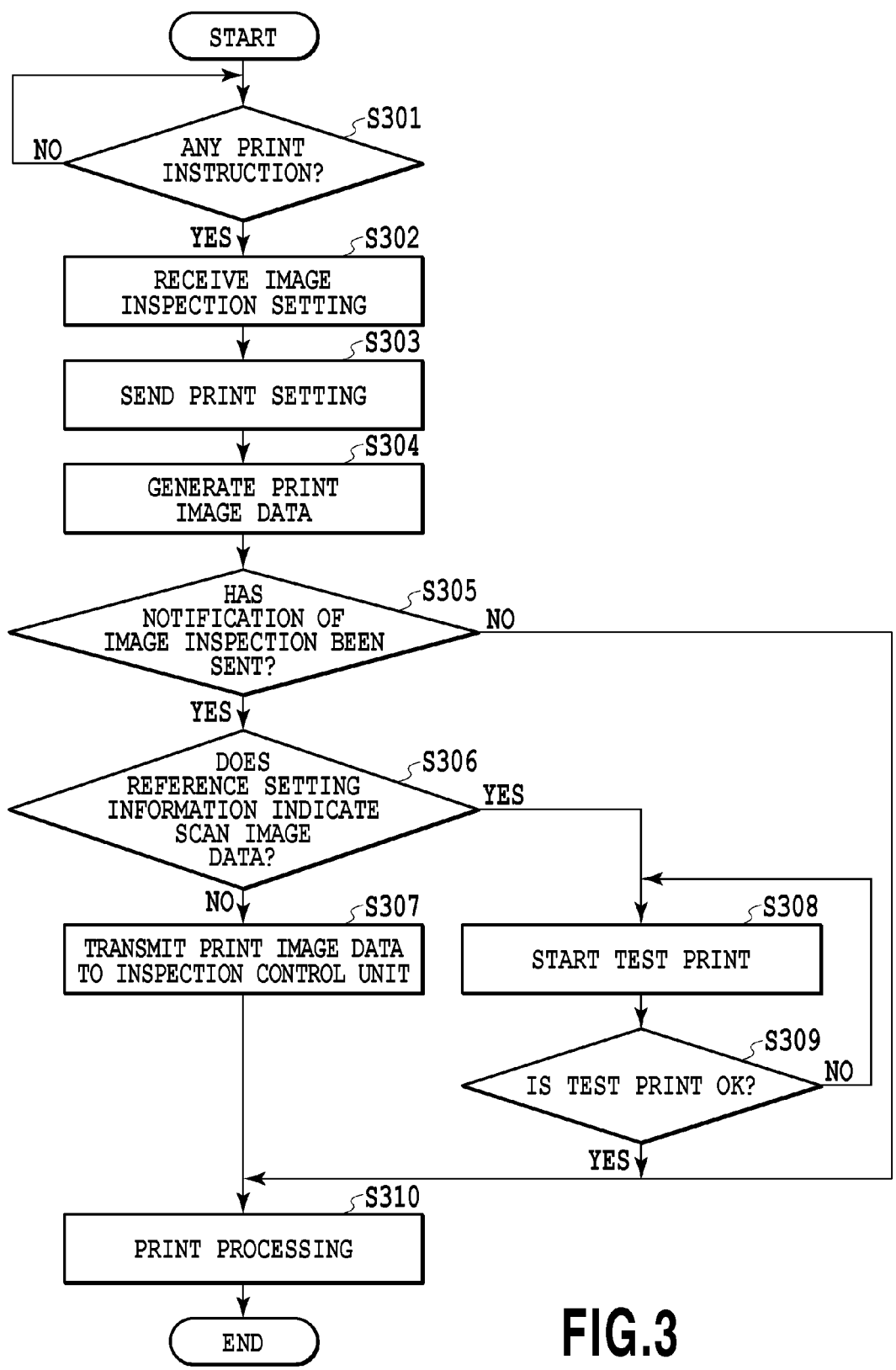
FIG. 3 is a flow chart of a printing process in a first embodiment.
Figure 5:
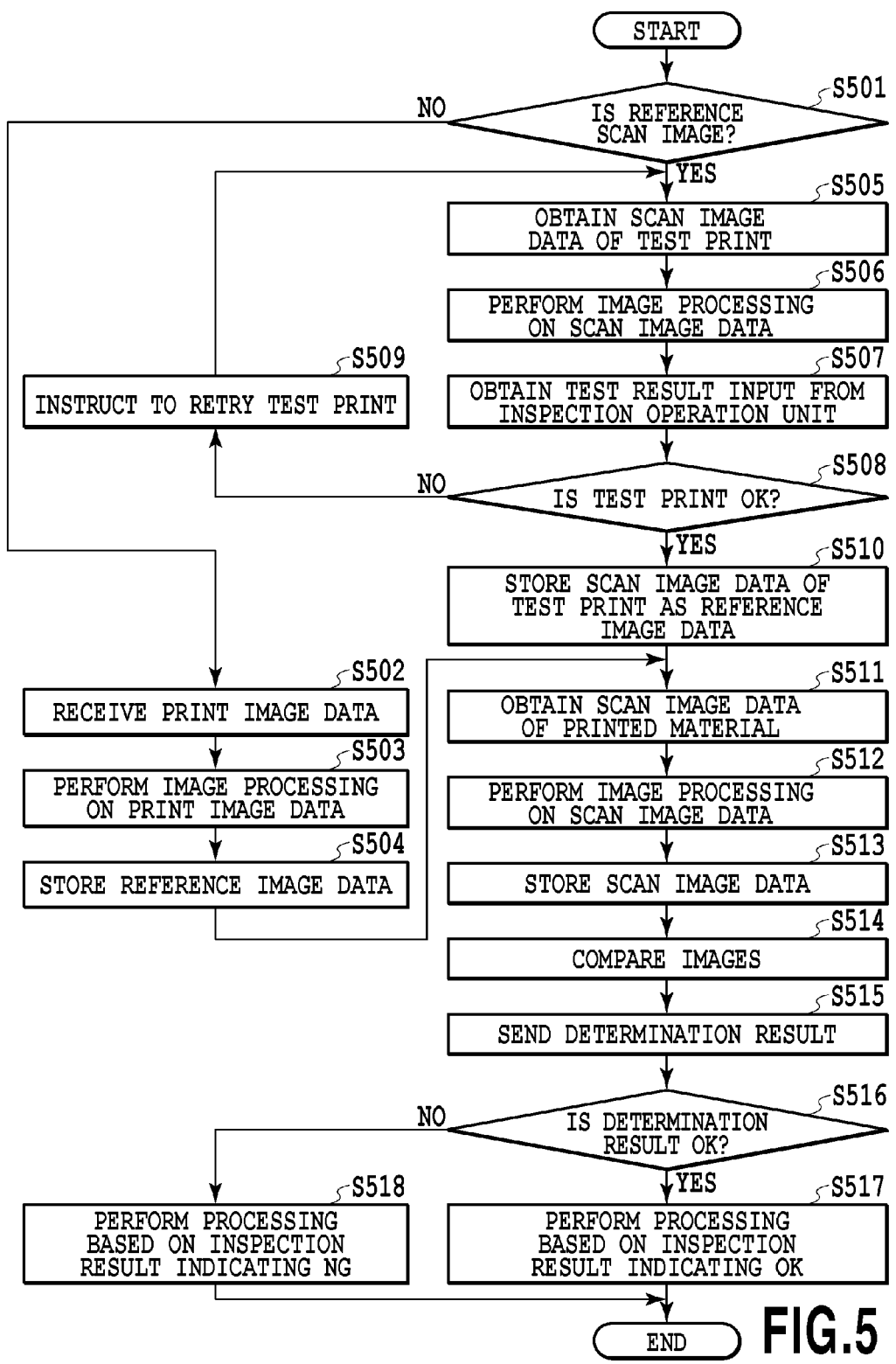
FIG. 5 is a flow chart of an image inspection process in the first embodiment.

In the second embodiment, configurations, operation flow charts, and control are the same as those of FIGS. 1 to 9 in accordance with the first embodiment except for the operation flow charts shown in FIGS. 3, 4, and 5. Accordingly, only the differences will be described, and descriptions of the content which is similar to that in the first embodiment will be omitted.

Figure 10:
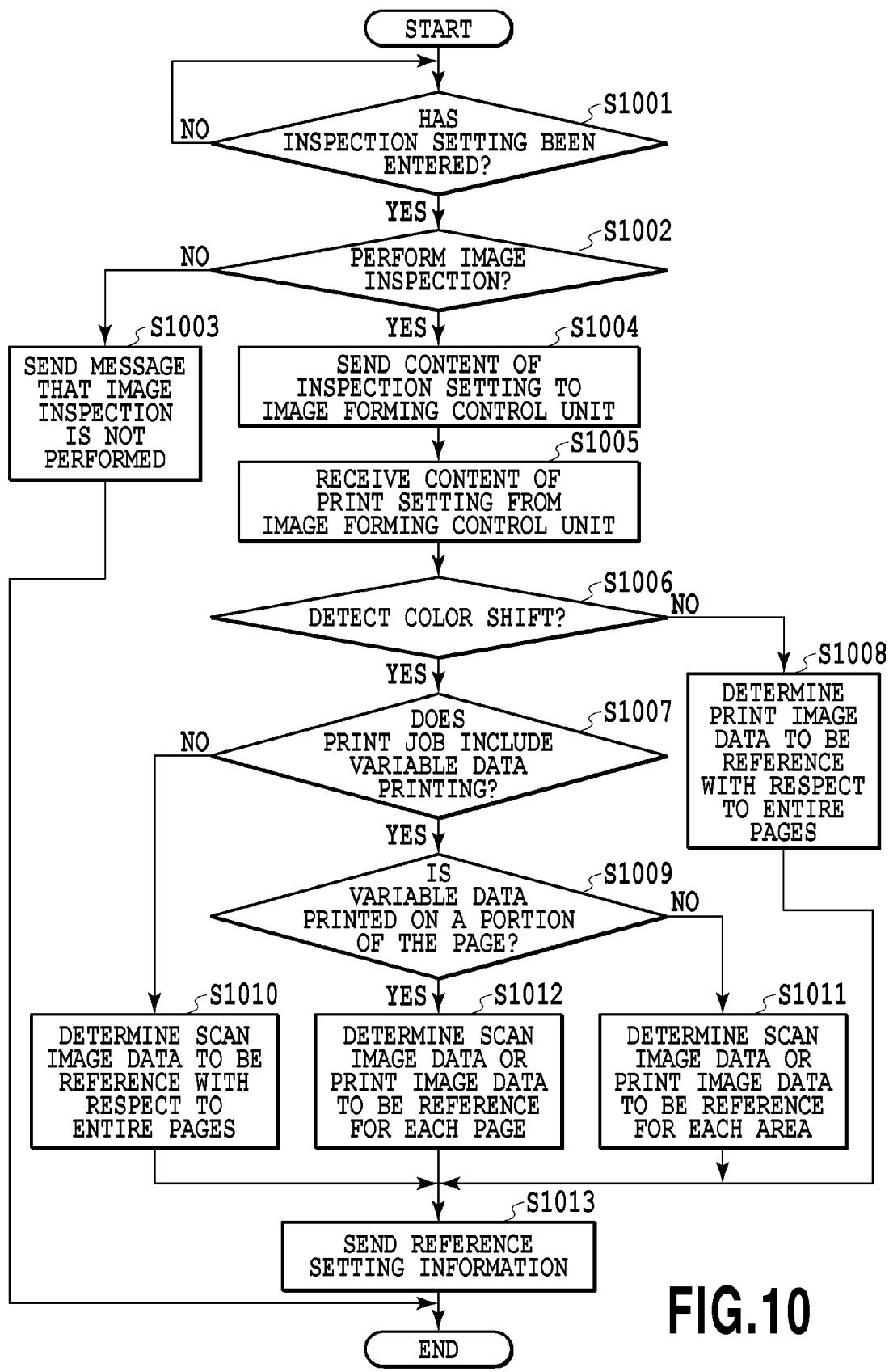
FIG. 10 is a flow chart of a reference determination process in a second embodiment.

First, the process for determining a reference in accordance with the second embodiment will be described with reference to the flow chart of FIG. 10.

The inspection control unit 216 determines whether a user has entered an inspection setting as to inspection items including a precision level of image inspection to the inspection operation unit 211 (S1001).

In a case where a user has entered an inspection setting (YES in S1001), the inspection control unit 216 determines whether the inspection setting includes image inspection (S1002).

In a case where image inspection is not set (NO in S1002), the inspection control unit 216 sends the setting to the image forming control unit 206 and completes the process (S1003).

On the other hand, in a case where image inspection is set (YES in S1002), the inspection control unit 216 sends the content of the inspection setting to the image forming control unit 206 (S1004).

Then, the inspection control unit 216 receives from the image forming control unit 206 the print setting indicating the content of the setting used in processing print image data by the print image processing unit 208 (S1005).

Then, the reference image determination unit 215 determines whether the instructed image inspection includes color shift detection on the basis of the print setting received in S1005 and the inspection setting entered in S1001 (S1006).

In a case where it is determined that the image inspection does not include color shift detection (NO in S1006), the reference image determination unit 215 determines the print image data to be a reference with respect to the entire pages associated with one print job (S1008).

On the other hand, in a case where it is determined that the image inspection includes color shift detection (YES in S1006), the reference image determination unit 215 determines whether the print job includes VDP (S1007).

In a case where the print job does not include VDP (NO in S1007), the reference image determination unit 215 determines the scan image data to be a reference with respect to the entire pages associated with the print job (S1010). On the other hand, in a case where the print job includes VDP (YES in S1007), the reference image determination unit 215 determines whether to print variable data over the page or only on a portion of the page in the respective pages associated with the print job (S1009).

In a case where the variable data is printed over the page (NO in S1009), the reference image determination unit 215 determines a reference for each page (S1011). In particular, for the pages having variable data printed over the page, the print image data is determined to be a reference. For the pages having no variable data printed thereon, the scan image data is determined to be a reference.

On the other hand, in a case where the variable data is printed only on a portion of the page (YES in S1009), the reference image determination unit 215 determines a reference according to an area on each page (S1012). In particular, in each page, the print image data is determined to be a reference for an area on which variable data is printed. The scan image data is determined to be a reference for other areas.

Finally, the inspection control unit 216 sends the reference setting information indicating the determined reference to the image forming control unit 206 (S1013).

In this manner, the image inspection unit 201 determines a reference in accordance with the above-described process.

Figure 11:
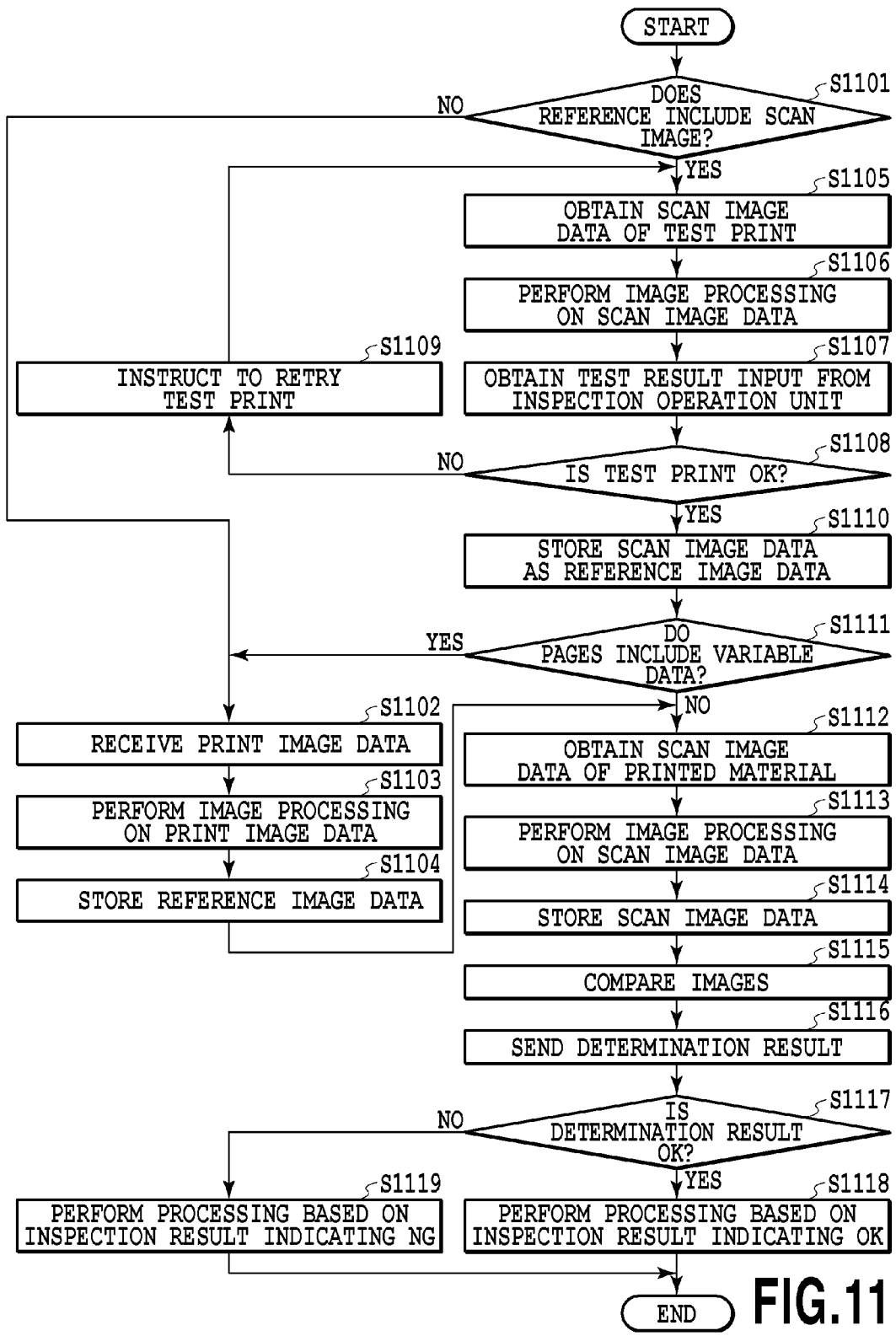
FIG. 11 is a flow chart of an image inspection process in the second embodiment.

Next, an image inspection process in the image inspection unit 210 is described with reference to the flow chart of FIG. 11.

First, the inspection control unit 216 determines whether a reference determined by the reference image determination unit 215 includes "scan image data" (S1101).

In a case where a reference is print image data (NO in S1101), the inspection control unit 216 receives the print image data from the image forming control unit 206 (S1102).

The inspection control unit 216 then transfers the received print image data to the reference image processing unit 213. The reference image processing unit 213 performs reference image processing which generates reference image data obtained by performing resolution conversion on the print image data in accordance with the inspection setting entered in S1101 (S1103).

Then, the inspection control unit 216 stores the reference image data in the reference image storage unit 222 (S1104).

On the other hand, in a case where a reference includes scan image data (YES in S1101), the inspection control unit 216 controls the mechanism process control unit 209 and instructs the image forming control unit 206 to test print the data on a recording medium.

Then, the inspection control unit 216 controls the inspection scanner 217 through the scan image processing unit 218 to cause the scanning light source 603 to emit light, allowing the scanning sensor 605 to obtain the scan image data of the printed material for a test print (S1105).

The inspection control unit 216 then controls the scan image processing unit 218 to perform scan image processing on the scan image data obtained in S1105 (S1106).

Then, the inspection control unit 216 obtains a user input (test result input) indicating whether the test print result has a desirable quality for the user (S1107).

The inspection control unit 216 then determines whether the test result input obtained in S1107 is "OK" or "NG" (S1108).

In a case where the test result input is "NG" (NO in S1108), the inspection control unit 216 instructs the image forming control unit 206 to change the setting and reperform a test print, and the process moves to S1105 (S1109).

On the other hand, in a case where the test result input is "OK" (YES in S1108), the reference image storage unit 222 stores the scan image data on which scan image processing is performed in S1106 as reference image data (S1110).

Then, the inspection control unit 216 determines whether the pages to be printed include variable data (S1111).

In a case where the pages to be printed include variable data (YES in S1111), the process moves to S1102 and the inspection control unit 216 obtains print image data associated with the variable data (S1102). That is, in a case where the variable data is printed only on a portion of the page or the variable data is printed over the page, the print image data associated with the corresponding area is obtained.

On the other hand, in a case where the pages to be printed do not include variable data (NO in S1111), the process moves to S1112.

In S1112, the inspection scanner 217 and the scan image processing unit 218 are controlled to obtain scan image data of the printed material printed based on the setting instructed by the image forming control unit 206 for the pages to be printed (S1112).

Incidentally, the scan image data obtaining processing performed in S1112 is the same process as that performed in S1105.

Then, the inspection control unit 216 controls the scan image processing unit 218 to perform scan image processing on the scan image data of the printed material obtained in S1112 (S1113).

The inspection control unit 216 then causes the scan image storage unit to store the scan image data on which the scan image processing is performed (S1114).

Then, the inspection control unit 216 performs image comparison determination. In this process, the inspection control unit 216 transfers the reference image data in the reference image storage unit 222 and the scan image data in the scan image storage unit 221 to the image comparison determination unit 220. Then, comparison is made between the reference image data and the scan image data to determine the quality (S1115).

Here, in a case where color shift detection is performed, for the pages not including variable data at all, scan image data of the printed material for a test print is used as reference image data. For the pages including variable data in a portion of the page, print image data is used as reference image data for the area associated with the variable data, whereas scan image data of the printed material for a test print is used as reference image data for other areas.

Incidentally, information on pages or areas on which the variable data is printed is included in the print setting or print image data sent from the image forming unit.

Next, after the image comparison in S1115, the inspection control unit 216 sends a determination result of the quality of the printed material (non-defective or defective) obtained by the image comparison determination unit 220 to the image forming control unit 206 (S1116).

At the same time, the inspection control unit 216 determines the result to display an image inspection result on the inspection display unit 214 (S1117).

In a case where the determination result is "non-defective", the inspection control unit 216 displays "OK" indicating that the image inspection result is OK as shown in FIG. 8 on the inspection display unit 214 (S1118).

On the other hand, in a case where the determination result is "defective", the inspection control unit 216 displays "NG" indicating that the image inspection result is NG as shown in FIG. 9 on the inspection display unit 214 (S1119).

Accordingly, the image inspection in the image inspection unit 210 is completed.

Figure 12:
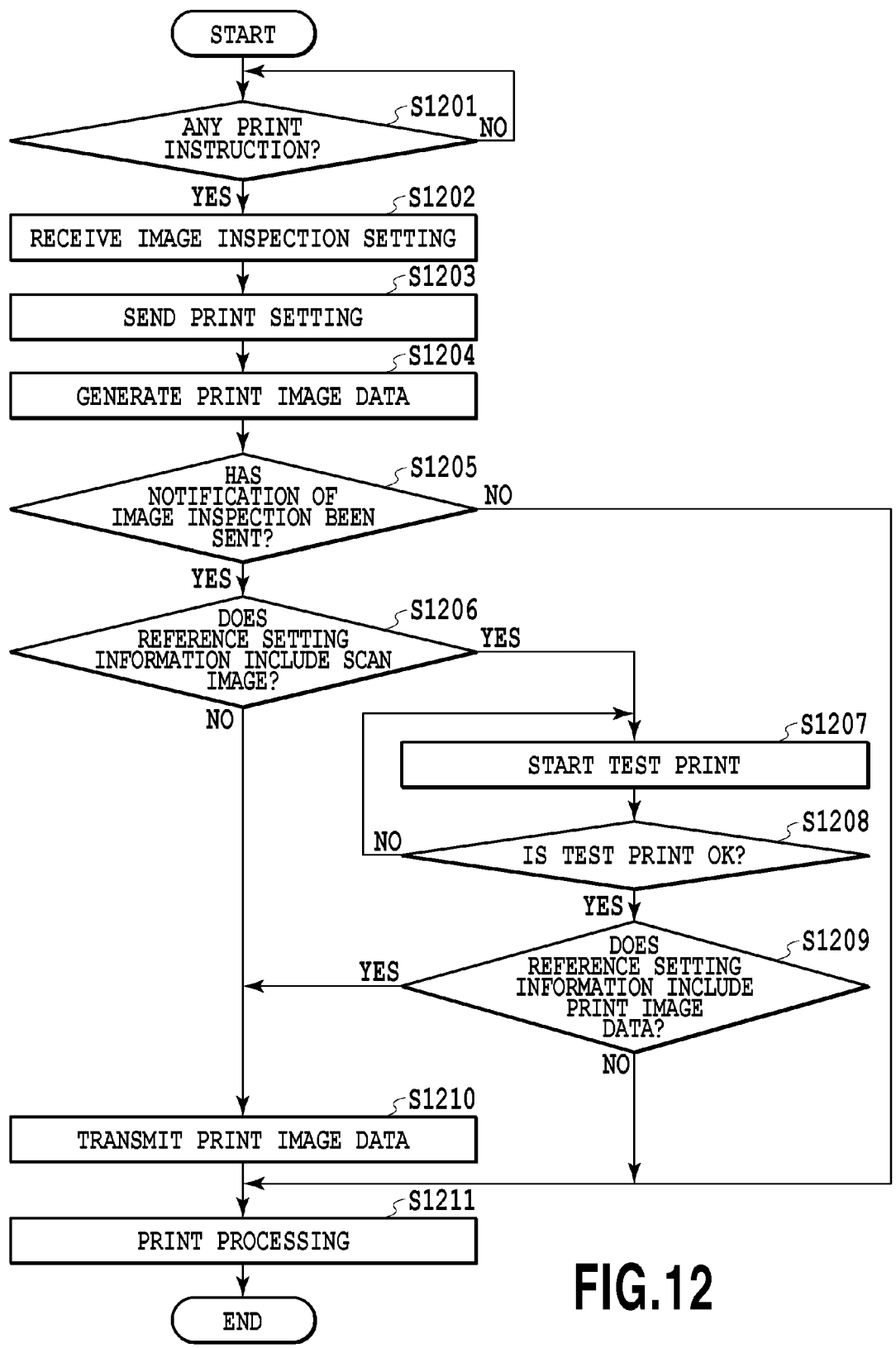
FIG. 12 is a flow chart of a printing process in the second embodiment.

Next, a printing process in the image forming unit 201 will be described with reference to the flow chart of FIG. 12.

First, the image forming control unit 206 determines whether a user has sent a print instruction through a PC (not shown) connected with the LAN 202 or the operation unit 205 (S1201).

In a case where it is determined that a print instruction has been sent in S1201, the image forming control unit 206 receives the inspection setting sent from the inspection control unit 216 in the above-described S1004 (S1202).

Then, the image forming control unit 206 sends the print setting entered by the user through the PC connected with the LAN 202 or the operation unit 205 to the inspection control unit 216 (S1203).

Then, the image forming control unit 206 controls the RIP processing unit 204 and the print image processing unit 208 to generate print image data (S1204).

Then, the image forming control unit 206 determines whether to perform image inspection on the basis of the inspection setting received in S1202 (S1205).

Then, the image forming control unit 206 determines whether the reference setting information sent in the above-described S1013 includes "scan image data" (S1206).

In a case where the reference setting information does not include "scan image data" (NO in S1206), the image forming control unit 206 sends the print image data generated in S1204 to the inspection control unit 216 (S1210).

On the other hand, in a case where the reference setting information includes "scan image data" (YES in S1206), the image forming control unit 206 controls the mechanism process control unit to print one copy of the print image data generated in S1204 for a test print (S1207).

Incidentally, in this test print in a case where variable data is included in a page associated with the test print, the test print is performed for an area not including the variable data.

Next, the image forming control unit 206 determines whether the test print input obtained by quality determination by a user's visual check in the above-described S1108 is "OK" or "NG" (S1208).

In a case where the test print input is "NG" (NO in S1208), the process moves to S1207 to reperform a test print.

On the other hand, in a case where the test print input is "OK" (OK in S1208), the image forming control unit 206 determines whether the reference setting information sent in the above-described S1013 includes print image data (S1209).

In a case where it is determined that the reference setting information includes print image data in S1209 (YES in S1209), the print image data is sent to the inspection control unit 216 (S1210) and the process proceeds to S1211.

On the other hand, in a case where it is determined that the reference setting information does not include print image data in S1209 (NO in S1209), the process proceeds to S1211.

Finally, the image forming control unit 206 controls the mechanism process control unit to print the print image data generated in S1204 according to the print setting instructed in S1201.

Accordingly, the print processing by the image forming unit 201 is completed.

Consequently, setting a reference according to the content of the pages to be printed can provide an image forming apparatus with image inspection functions which can avoid affecting inspection processing speed and achieve low costs.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-144450, filed Jun. 27, 2012, which is hereby incorporated by reference herein in its entirety.

What is claimed is:

1. An inspection apparatus comprising:
a scanning unit configured to generate first scan image data by scanning printed material to be inspected on which print image data associated with a print job is printed;
an accepting unit configured to accept an inspection setting indicating an inspection content for the printed material to be inspected;
a selection unit configured to select image data as a reference from either of the print image data or second scan image data different from the first scan image data according to the accepted inspection setting, the second scan image data having been generated by scanning prepared printed material on which the print image data has been printed as a test print; and
a determination unit configured to determine whether or not a quality of the printed material to be inspected is good by comparing the first scan image data generated by the scanning unit with image data selected as the reference by the selection unit,
wherein in a case where the print job includes variable data and the inspection setting includes color shift detection, with respect to an area on a particular page on which the variable data is printed and an area on the particular page where variable data is not printed, the selection unit is configured to select print image data associated with the variable data as the reference for an area corresponding to the variable data on the particular page, and to select second scan image data as the reference for an area on the particular page that does not contain variable data.

2. The inspection apparatus according to claim 1, further comprising:
a display unit configured to display the second scan image data associated with the test print; and
a print instruction unit configured to instruct a printing unit to change a print setting and reperform a test print of the print image data associated with the print job in a case where an instruction to reperform a test print is given by a user after the display unit displays the second scan image data.

3. The inspection apparatus according to claim 1, wherein the selection unit is configured to select the second scan image data associated with the test print as the reference in a case where the inspection setting includes color shift detection and the print job does not include variable data.

4. An inspection method comprising:
generating first scan image data by scanning printed material to be inspected on which print image data associated with a print job is printed;
accepting an inspection setting indicating an inspection content for the printed material to be inspected;
selecting image data as a reference from either of the print image data or second scan image data different from the first scan image data according to the accepted inspection setting, the second scan image data having been generated by scanning prepared printed material on which the print image data has been is printed as a test print; and
determining whether or not a quality of the printed material to be inspected is good by comparing the first scan image data generated by scanning printed material to be inspected with image data as the reference in the selecting step,
wherein in a case where the print job includes variable data and the inspection setting includes color shift detection, with respect to an area on a particular page on which the variable data is printed and an area on the particular page where variable data is not printed, selecting print image data associated with the variable data as the reference for an area corresponding to the variable data on the particular page, and selecting second scan image data as the reference for an area on the particular page that does not contain variable data.

5. A non-transitory computer readable medium for causing a computer to perform an inspection method comprising:
generating first scan image data by scanning printed material to be inspected on which print image data associated with a print job is printed;
accepting an inspection setting indicating an inspection content for the printed material to be inspected;
selecting image data as a reference from either of the print image data or second scan image data different from the first scan image data according to the accepted inspection setting, the second scan image data having been generated by scanning prepared printed material on which the print image data has been printed as a test print; and
determining whether or not a quality of the printed material to be inspected is good by comparing the first scan image data generated by scanning printed material to be inspected with image data as the reference in the selecting step,
wherein in a case where the print job includes variable data and the inspection setting includes color shift detection, with respect to an area on a particular page on which the variable data is printed and an area on the particular page where variable data is not printed, selecting print image data associated with the variable data as the reference for an area corresponding to the variable data on the particular page, and selecting second scan image data as the reference for an area on the particular page that does not contain variable data.

* * * * *